(12) United States Patent
Ahlman

(10) Patent No.: US 12,257,117 B2
(45) Date of Patent: Mar. 25, 2025

(54) FLEXIBLE SPRING AND MOTOR ASSEMBLY

(71) Applicant: KONINKLIJKE PHILIPS N.V., Eindhoven (NL)

(72) Inventor: Dave Ahlman, Bothell, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 815 days.

(21) Appl. No.: 17/435,710

(22) PCT Filed: Feb. 14, 2020

(86) PCT No.: PCT/EP2020/053934
§ 371 (c)(1),
(2) Date: Sep. 2, 2021

(87) PCT Pub. No.: WO2020/182410
PCT Pub. Date: Sep. 17, 2020

(65) Prior Publication Data
US 2022/0151755 A1 May 19, 2022

Related U.S. Application Data

(60) Provisional application No. 62/815,547, filed on Mar. 8, 2019.

(51) Int. Cl.
*A61C 17/34* (2006.01)
*F16F 1/02* (2006.01)
(Continued)

(52) U.S. Cl.
CPC .............. *A61C 17/34* (2013.01); *F16F 1/027* (2013.01); *H02K 1/141* (2013.01); *H02K 1/145* (2013.01);
(Continued)

(58) Field of Classification Search
CPC ........ A61C 17/34; H02K 33/12; H02K 33/02; H02K 33/14; F16F 15/12
See application file for complete search history.

(56) References Cited

U.S. PATENT DOCUMENTS 1,460,212 A 6/1923 Olive
3,811,665 A 5/1974 Seelig
(Continued)

FOREIGN PATENT DOCUMENTS

DE 2948179 A1 6/1981
EP 1347192 A2 9/2003
(Continued)

OTHER PUBLICATIONS

International Search Report From PCT/EP2020/053934 Mailed Sep. 17, 2020.

*Primary Examiner* — Andrew A Horton

(57) ABSTRACT

A personal care appliance which includes at least one flexible spring. The flexible spring having an grounded section with an outer surface and an inner surface, a rotational member arranged radially within the grounded section, wherein the rotational member is arranged to rotate within the grounded section in a first rotational direction about an imaginary rotational axis, and a compliant member having a first end and a second end, wherein the first end is operatively engaged with the inner surface of the grounded section and the second end operatively engaged with the rotational member. The compliant member has a first stiffness such that the compliant member is arranged to resist rotation of the rotational member in at least the first rotational direction.

14 Claims, 13 Drawing Sheets

(51) Int. Cl.
  *H02K 1/14*    (2006.01)
  *H02K 1/2706*  (2022.01)
  *H02K 7/14*    (2006.01)
  *H02K 33/12*   (2006.01)

(52) U.S. Cl.
  CPC ............ *H02K 1/2706* (2013.01); *H02K 7/14* (2013.01); *H02K 33/12* (2013.01); *F16F 2236/08* (2013.01)

(56) References Cited

U.S. PATENT DOCUMENTS

| | | |
|---|---|---|
| 9,079,672 B2 | 7/2015 | Baudasse |
| 2008/0106156 A1 | 5/2008 | Reishus et al. |
| 2011/0239383 A1* | 10/2011 | Nishiura ............... H02K 33/12 15/22.1 |
| 2012/0034027 A1 | 2/2012 | Valois |

FOREIGN PATENT DOCUMENTS

| | | |
|---|---|---|
| EP | 2685617 A2 | 1/2014 |
| WO | 2013010234 A1 | 1/2013 |

* cited by examiner

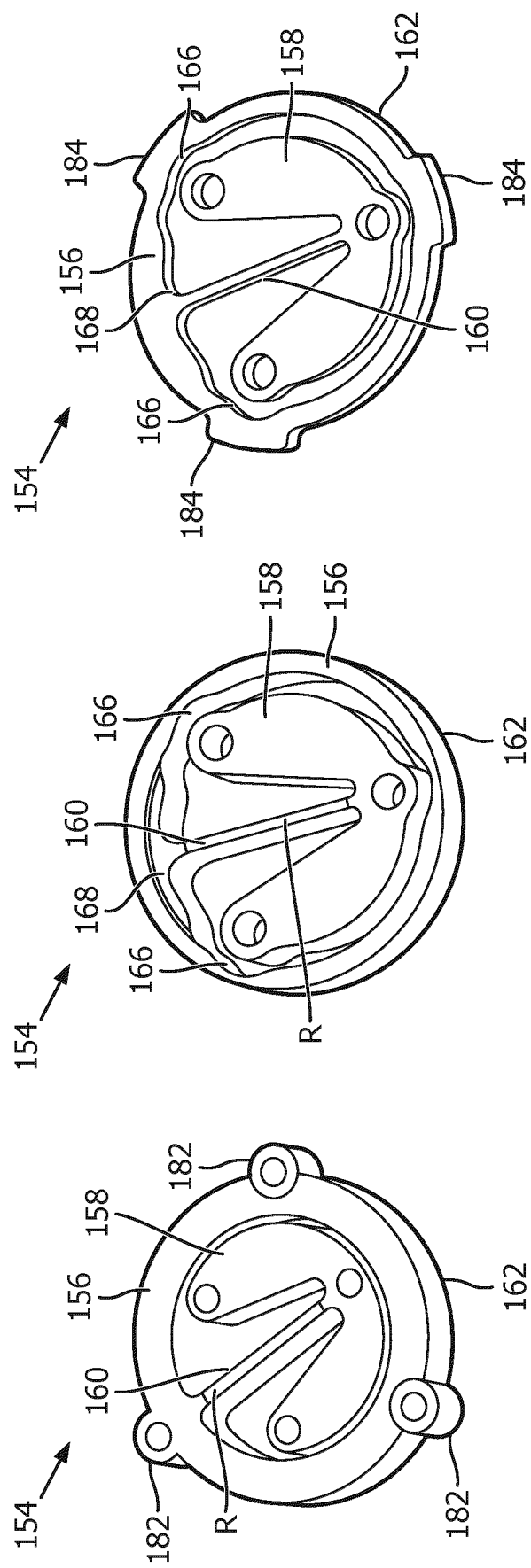

FLEXIBLE SPRING AND MOTOR ASSEMBLY

This application is the U.S. National Phase application under 35 U.S.C. § 371 of International Application No. PCT/EP2020/053934, filed on Feb. 14, 2020, which claims the benefit of U.S. Provisional Application Ser. No. 62/815,547, filed Mar. 8, 2019. These applications are hereby incorporated by reference herein.

FIELD OF THE DISCLOSURE

The present disclosure is directed generally to personal care appliances, more specifically to drive motors for personal care appliances, even more specifically, to flexible spring members within a drive motor for a personal care appliance.

BACKGROUND

Personal care appliances, for example, power toothbrushes, contain components which generate rotational motion of a drive shaft. The drive shaft is connected to a brush head which contacts and cleans a user's teeth during use of the personal care appliance. The drive shaft of the personal care appliance experiences vibrations and oscillations and torsional forces during use which reach the user creating an undesirable user experience.

SUMMARY OF THE DISCLOSURE

The present disclosure is related to a personal care appliance which includes at least one flexible spring. The flexible spring having a grounded section, a rotational member arranged to rotate within the grounded section, and a compliant member. The compliant member has a first stiffness such that the compliant member is arranged to resist rotation of the rotational member within the grounded section in at least a first rotational direction.

In one aspect a flexible spring is provided, the flexible spring including a grounded section having an outer surface and an inner surface, a rotational member arranged radially within the grounded section, wherein the rotational member is arranged to rotate within the grounded section in a first rotational direction about an imaginary rotational axis, and a compliant member having a first end and a second end, wherein the first end is operatively engaged with the inner surface of the grounded section and the second end operatively engaged with the rotational member. Additionally, the compliant member has a first stiffness such that the compliant member is arranged to resist rotation of the rotational member in at least the first rotational direction.

In an aspect, the rotational member further comprises a first body portion and a second body portion wherein the first body portion and the second body portion are symmetrical about an imaginary vertical axis substantially parallel with the compliant member.

In an aspect, the first body portion of the rotational member has a first radially inwardly facing tab and the second body portion of the rotational member has a second radially inwardly facing tab, wherein the first radially inwardly facing tab and the second radially inwardly facing tab are arranged to limit rotation of the rotational member in the first rotational direction and a second rotational direction opposite the first rotational direction.

In an aspect, the rotational member further comprises a plurality of apertures.

In an aspect, the plurality of apertures comprises a first aperture, a second aperture, and a third aperture, wherein the first aperture, the second aperture, and the third aperture are rotationally offset 120 degrees from each other about the imaginary rotational axis.

In an aspect, the inner surface comprises a first indentation.

In an aspect, the inner surface comprises a first projection.

In an aspect, the outer surface further comprises a plurality of alignment tabs.

In an aspect, the outer surface further comprises a plurality of alignment apertures.

In an aspect, there is provided a personal care appliance including a housing having a cavity and a motor assembly within the cavity of the housing. The motor assembly includes a first plurality of flexible springs, each flexible spring of the first plurality of flexible springs including: an grounded section having an outer surface and an inner surface, a rotational member arranged radially within the grounded section, wherein the rotational member is arranged to rotate within the grounded section in a first rotational direction about an imaginary rotational axis, and a compliant member having a first end and a second end, wherein the first end is operatively engaged with the inner surface of the grounded section and the second end operatively engaged with the rotational member. Additionally, the compliant member has a first stiffness such that the compliant member is arranged to resist rotation of the rotational member in at least the first rotational direction.

In an aspect, the housing further comprises an output shaft arranged to rotate about the imaginary rotational axis, and the motor assembly further comprises a second plurality of flexible springs, wherein the first plurality of flexible springs and the second plurality of flexible springs are arranged to only allow the output shaft to rotate in the first rotational direction or a second rotational direction opposite the first rotational direction.

In an aspect, the motor assembly further includes a first hub arranged within the housing, and a stator sub-assembly. The stator sub-assembly includes a plurality of stator coils arranged to, generate a first magnetic field within the housing, and at least one magnet operatively engaged with the first hub, wherein the magnet, in response to the first magnetic field is arranged to rotate and drive the first hub about the imaginary rotational axis within the housing in at least the first rotational direction.

In an aspect, the housing includes a tube frame, the tube frame having a hub side and a magnet side. Additionally, the motor assembly further includes: a first hub arranged within the housing and proximate the hub side of the tube frame, a second hub arranged within the housing and proximate the magnet side of the tube frame, and a stator sub-assembly. The stator sub-assembly including a plurality of stator coils arranged to, generate a first magnetic field within the housing, at least one magnet operatively engaged with the second hub, wherein the magnet, in response to the first magnetic field is arranged to rotate and drive the first hub or the second hub of the stator sub-assembly about the imaginary rotational axis within the housing in at least the first rotational direction.

In an aspect, the first hub is arranged to rotate out of phase with the second hub about the imaginary rotational axis.

In an aspect, at least one torsion bar is arranged between the first hub and the second hub, wherein the torsion bar is arranged to receive, in response to a rotation of the second hub, a first torque and transfer the first torque to the first hub, wherein the rotation of the first hub and the rotation of the second hub are out of phase.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

FIG. 6A is a perspective view of a flexible spring according to the present disclosure.

FIG. 6B is a perspective view of a flexible spring according to the present disclosure.

FIG. 6C is a perspective view of a flexible spring according to the present disclosure.

DETAILED DESCRIPTION OF EMBODIMENTS

The present disclosure describes various embodiments of a personal care appliance which include at least one flexible spring. The flexible spring having a grounded section with an outer surface and an inner surface, a rotational member arranged radially within the grounded section, wherein the rotational member is arranged to rotate within the grounded section in a first rotational direction about an imaginary rotational axis, and a compliant member having a first end and a second end, wherein the first end is operatively engaged with the inner surface of the grounded section and the second end operatively engaged with the rotational member. Additionally, the compliant member has a first stiffness such that the compliant member is arranged to resist rotation of the rotational member in at least the first rotational direction.

Figure 1:
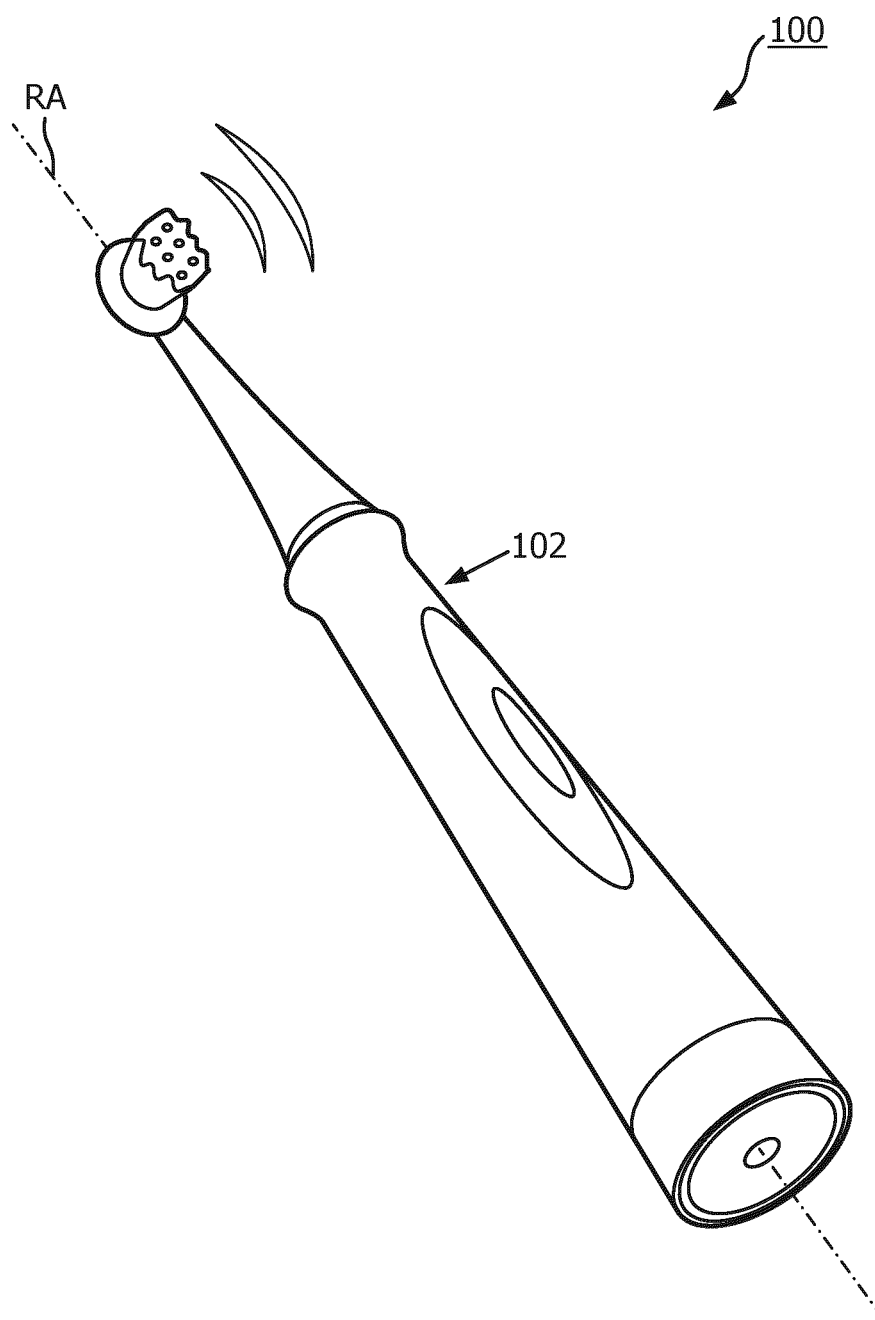
FIG. 1 is a perspective view of a personal care appliance according to the present disclosure.

Referring to the figures, FIG. 1 is a perspective view of personal care appliance 100. Broadly, personal care appliance comprises a housing 102 which completely encloses the working components of the personal care appliance. It should be appreciated that, although personal care appliance 100 is illustrated as a power toothbrush, the disclosure can relate to any personal care appliance or any appliance or tool that utilizes an oscillating motor. For the sake of clarity, at least some of the working parts of personal care appliance 100 which provide the oscillating and/or vibrational motion to a user's teeth will not be discussed in detail in the present disclosure. For example, personal care appliance 100 may include a brush head arranged to engage with output shaft 114 (discussed below) in response to the user providing a user input to personal care appliance 100, e.g., by depressing a button or a contacting touch-capacitive sensor arranged on housing 102. Furthermore, the electronic components which relay the signal from such an input to the motor assembly (discussed below) are not described or illustrated herein.

Figure 2:
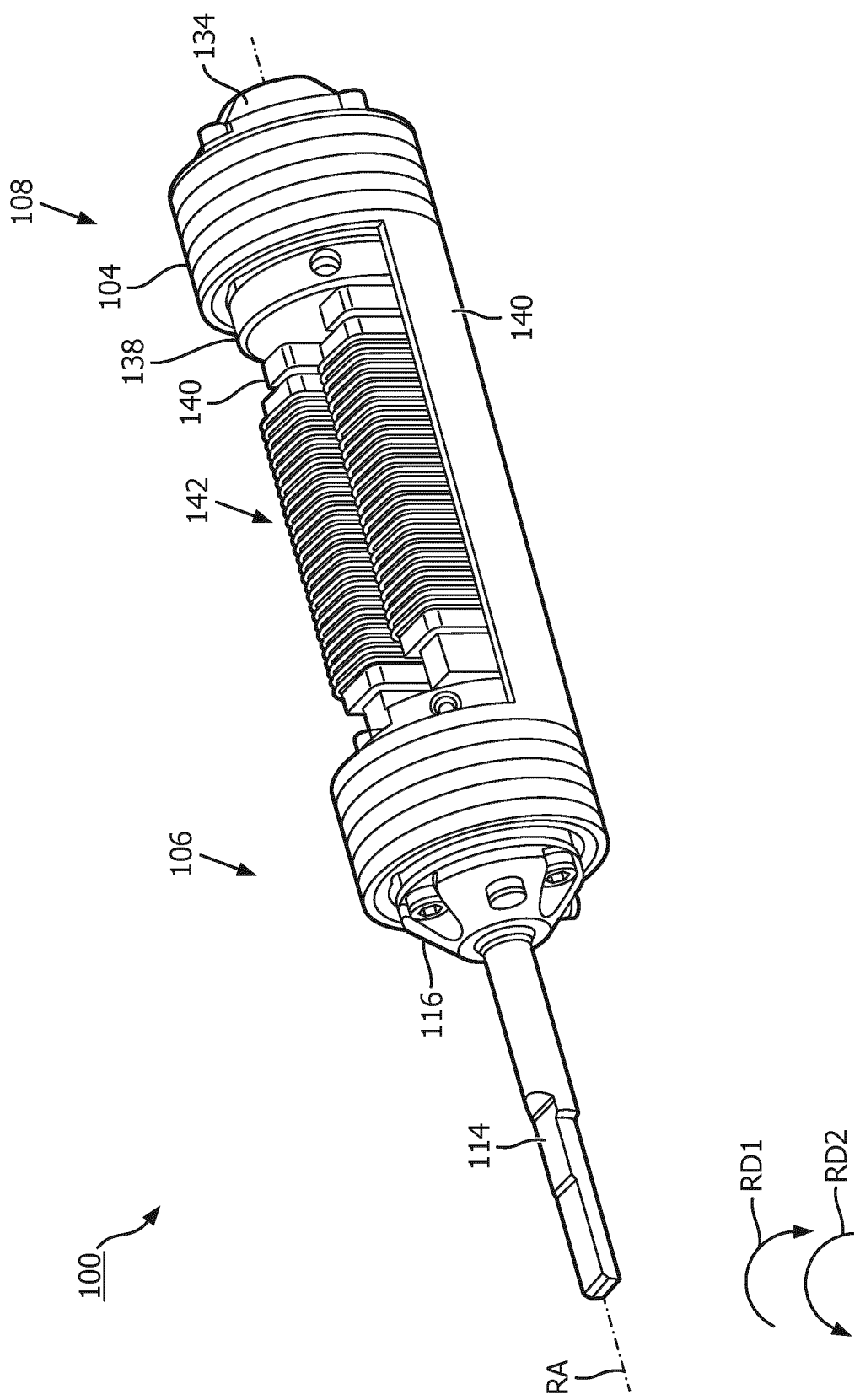
FIG. 2 is a perspective view of a personal care appliance with the housing removed according to the present disclosure.
Figure 3A:
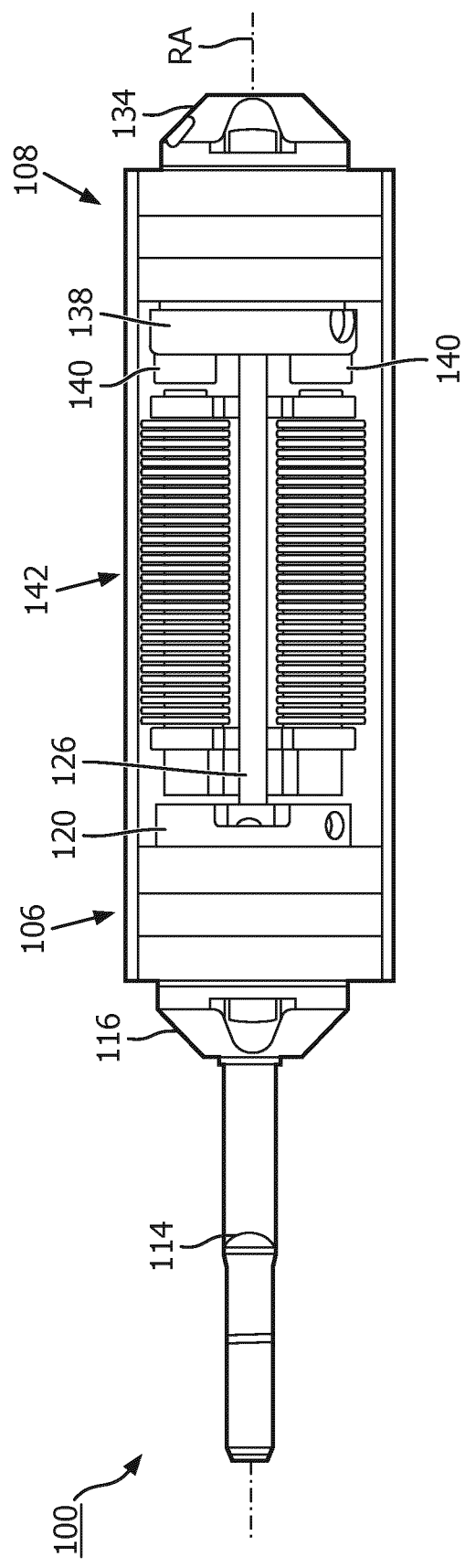
FIG. 3A is a side view of a personal care appliance with the housing removed according to the present disclosure.
Figure 3B:
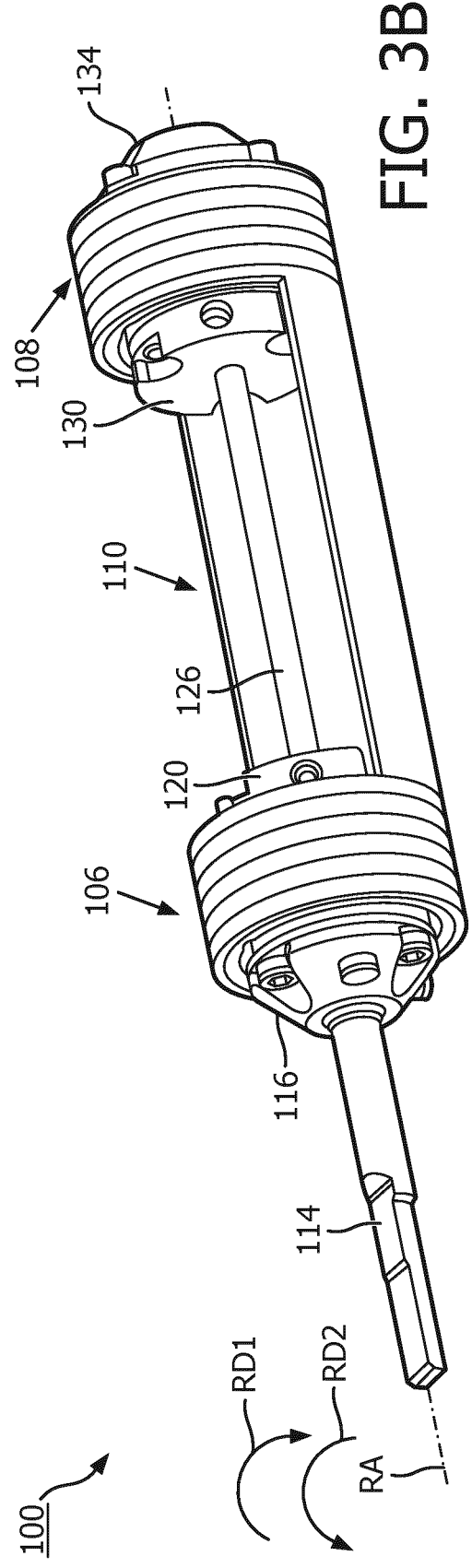
FIG. 3B is a side perspective view of a personal care appliance with the housing and motor assembly removed.
Figure 4:
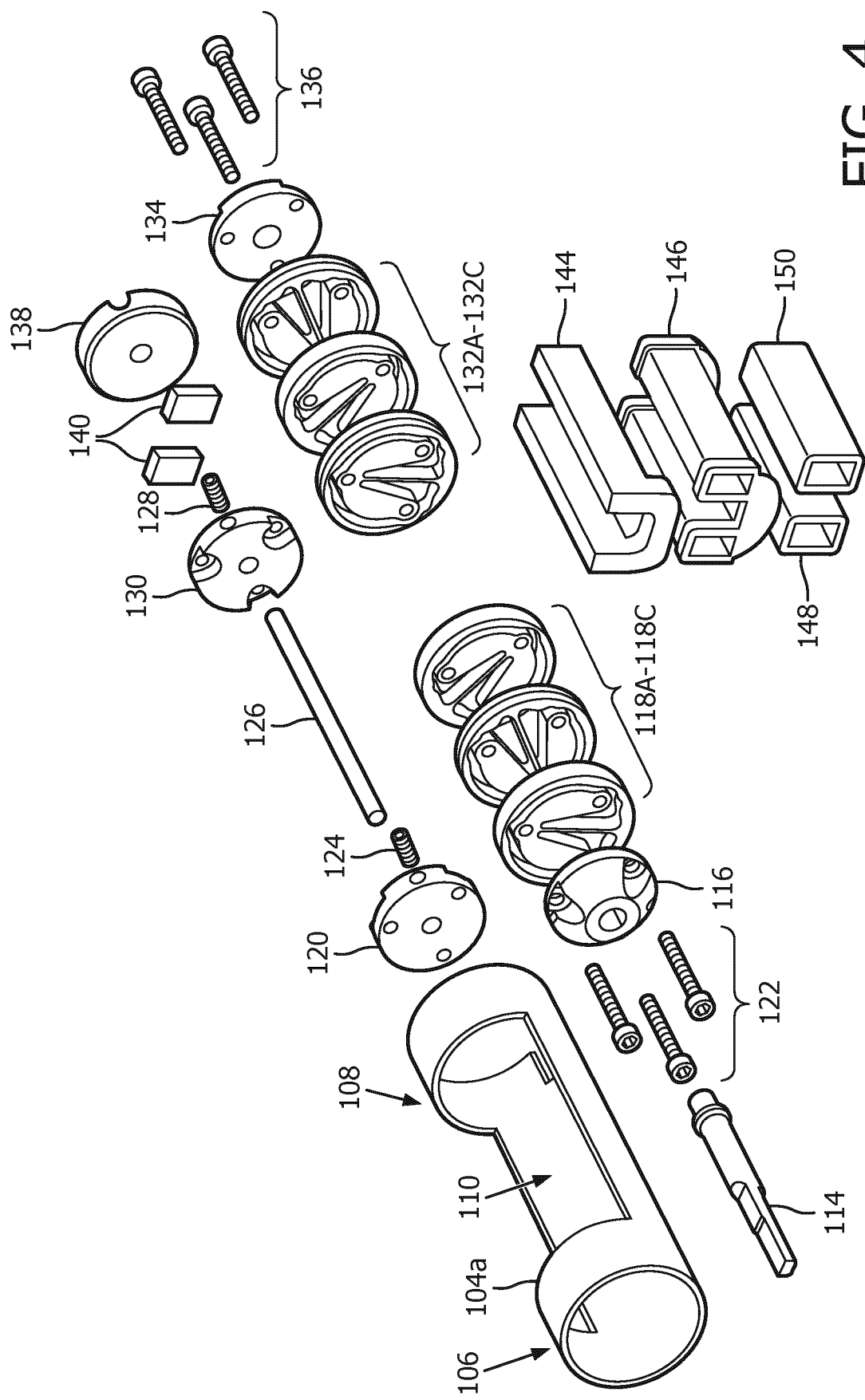
FIG. 4 is an exploded side perspective view of a personal care appliance with the housing removed according to the present disclosure.

The following description should be read in view of FIGS. 2-4. FIG. 2 is a perspective view of personal care appliance 100 with housing 102 (shown in FIG. 2) removed. FIG. 3A is a side view of personal care appliance 100 with housing 102 (shown in FIG. 2) removed. FIG. 3B is a side perspective view of personal care appliance 100 with housing 102 (shown in FIG. 2) and motor assembly 112 (discussed below) removed. FIG. 4 is an exploded side perspective view of personal care appliance 100 with housing 102 (shown in FIG. 2) removed.

Within housing 102 (shown in FIG. 2), personal care appliance 100 comprises tube frame 104 which has a hub side 106, a magnet side 108, and a cavity 110. Tube frame 104 has a substantially longitudinal body which is arranged along a rotational axis RA parallel with housing 102. Hub side 106 is arranged proximate to the brush head of personal care appliance 100 and magnet side 108 is arranged at a distal end of personal care appliance opposite hub side 106. Cavity 110 is arranged radially within the tubular longitudinal body of tube frame 104 and arranged to receive at least the motor assembly 112 discussed below.

Motor assembly 112 is arranged within cavity 110 of tube frame 104. The portion of motor assembly 112 that is proximate to hub side 106 of tube frame 104 includes output shaft 114, first hub 116, first plurality of flexible springs 118A-118C, first stack hub 120, and first plurality of stack fasteners 122. Output shaft 114 is arranged to receive rotational motion and transfer that rotational motion to the brush head of personal care appliance 100. First hub 116 further includes a plurality of peripheral apertures to receive the respective fasteners of the first plurality of stack fasteners 122, as well as, a central aperture arranged to receive output shaft 114. Similarly, each flexible spring of the first plurality of flexible springs 118A-118C have apertures that align and are arranged to receive the respective stack fasteners of the first plurality of stack fasteners 122. Moreover, first stack hub 120 includes a plurality of peripheral apertures to receive the respective fasteners of the first plurality of stack fasteners 122, as well as, a central aperture arranged to receive first set fastener 124 and subsequently torsion bar 126 as discussed below. The arrangement of first hub 116, first plurality of flexible springs 118A-118C, and first stack hub 120 are arranged to rotate as one rotational unit, i.e., a first rotational mass FM (shown in FIGS. 10B-11E).

The portion of motor assembly 112 that is proximate to magnet side 108 of tube frame 104 includes second stack hub 130, second plurality of flexible springs 132A-132C, second hub 134, second plurality of stack fasteners 136, magnetic cap 138, and magnet 140. Magnet 140 is fixedly secured to magnet cap 138 and is arranged to receive a first magnetic field 152 (not shown) from stator sub-assembly 142, discussed below, which causes magnetic cap 138 to rotate about rotational axis RA. It should be appreciated that magnet 140 can be a single magnet having two poles, i.e., a positive pole and a negative pole and take the shape of an annular ring arranged about torsion bar 126 discussed below. It should further be appreciated that a plurality of magnets 140 may be fixedly secured to magnetic cap 138. Second stack hub 130 is fixedly secured to magnetic cap 138 and includes a plurality of peripheral apertures to receive the respective fasteners of the second plurality of stack fasteners 136, as well as, a central aperture arranged to receive second set fastener 128 secured to torsion bar 126. Similarly, each flexible spring of the second plurality of flexible springs 132A-132C have apertures that align and are arranged to receive the respective stack fasteners of the second plurality of stack fasteners 136. Moreover, second hub 134 includes a plurality of peripheral apertures to receive the respective fasteners of the second plurality of stack fasteners 136. The arrangement of second stack hub 130, second plurality of flexible springs 132A-132C, second hub 134, second plurality of stack fasteners 136, magnetic cap 138, and magnet 140 are arranged to rotate as one rotational unit, i.e., a second rotational mass SM (shown in FIGS. 10A-11E).

Between the portion of motor assembly 112 proximate to the hub side 106 and the portion of motor assembly 112 proximate the magnet side 108, is torsion bar 126. Torsion bar 126 has a first end and a second end, where the first end is arranged proximate hub side 106 and second end is proximate magnet side 108. As discussed above, the first side of torsion bar 126 is arranged to engage with first set fastener 124 and second side of torsion bar 126 is arranged to engage with second set fastener 128. First set fastener 124 and second set fastener 128 can have, e.g., a helical outer protrusion such that the outer surface of each set fastener has a helical screw-like male mating surface arranged to engage with a complimentary female mating surface in the center aperture of each respective stack hub, i.e., first stack hub 120 and second stack hub 130. Additionally, each set fastener can have an inner recess arranged to receive the first end and the second end of torsion bar 126, e.g., the first end and second end of torsion bar 126 can have a square or peg shaped protrusion arranged to matingly engage with a square or peg shaped recess in first set fastener 124 and second set fastener 128, respectively. It should be appreciated that other fastening mechanisms are possible, e.g., the first and second end of torsion bar 126 can be directly secured to first stack hub 120 and/or second stack hub 130. As discussed below, in one example, torsion bar 126 is arranged to flexible or twist in a first rotational direction RD1 and a second rotational direction RD2. Additionally, the first end of torsion bar 126 and the second end of torsion bar 126 can rotate out of phase with each other, i.e., not in a synchronized rotation. In one example, the first end of torsion bar 126 can rotate in the first rotational direction RD1 while the second end of torsion bar 126 rotates in the second rotational direction RD2.

Arranged about torsion bar 126, and longitudinally between first stack hub 120 and second stack hub 130 within cavity 110, is stator sub-assembly 142. Stator sub-assembly 142 includes stator laminations 144, stator sleeve 146, first stator coil 148 and second stator coil 150. Stator laminations 144 are intended to increase the overall electrical resistance of the stator sub-assembly without significantly affecting the stator sub-assembly's magnetic properties and prevent eddy current losses during operation. Stator laminations 144 are arranged radially within stator sleeve 146. First stator coil 148 and second stator coil 150 are arranged to wrap around stator sleeve 146 and magnetically insulate stator laminations 144. Providing first stator coil 148 and second stator coil 150 with an alternating input current, an alternating magnetic field is produced, i.e., first magnetic field 152 (not shown). In response to the alternating magnetic field produced in first magnetic field 152 (not shown), the magnet or magnets 140 will cause magnetic cap 138, and subsequently the portions of motor assembly 112 that are proximate the magnet side 108, to rotated about rotational axis RA.

During operation of personal care appliance 100, an alternating electric current is provided to first stator coil 148 and second stator coil 150. The electric field produced by this alternating current, i.e., first electric field 152 (not shown), causes magnets 140 and magnetic cap 138 to rotate in first rotational direction RD1 or second rotational direction RD2. Magnetic cap 138 rotates about rotational axis RA, in unison, i.e., as one unit, with the portion of motor assembly 112 proximate the magnet side 108 of tube frame 104. The rotation of the portion of motor assembly 112 proximate magnet side 108 is transferred to the portion of the motor assembly 112 proximate hub side 106 via torsion bar 126. As torsion bar 126 is rotationally pliable, the portion of motor assembly 112 proximate hub side 106 rotates out of phase, i.e., with a rotational lag, with the portion of motor assembly 112 proximate magnet side 108. This out of phase rotation between these portions, or masses, reduces the transfer of torsional vibrations that may be passed on to the user during operation and also reduces power requirements for personal care appliance 100. Additionally, the rotation of both portions of the motor assembly is stabilized by first plurality of flexible springs 118A-118C and second plurality of flexible springs 132A-132C, as will be discussed below in detail.

Figure 5A:
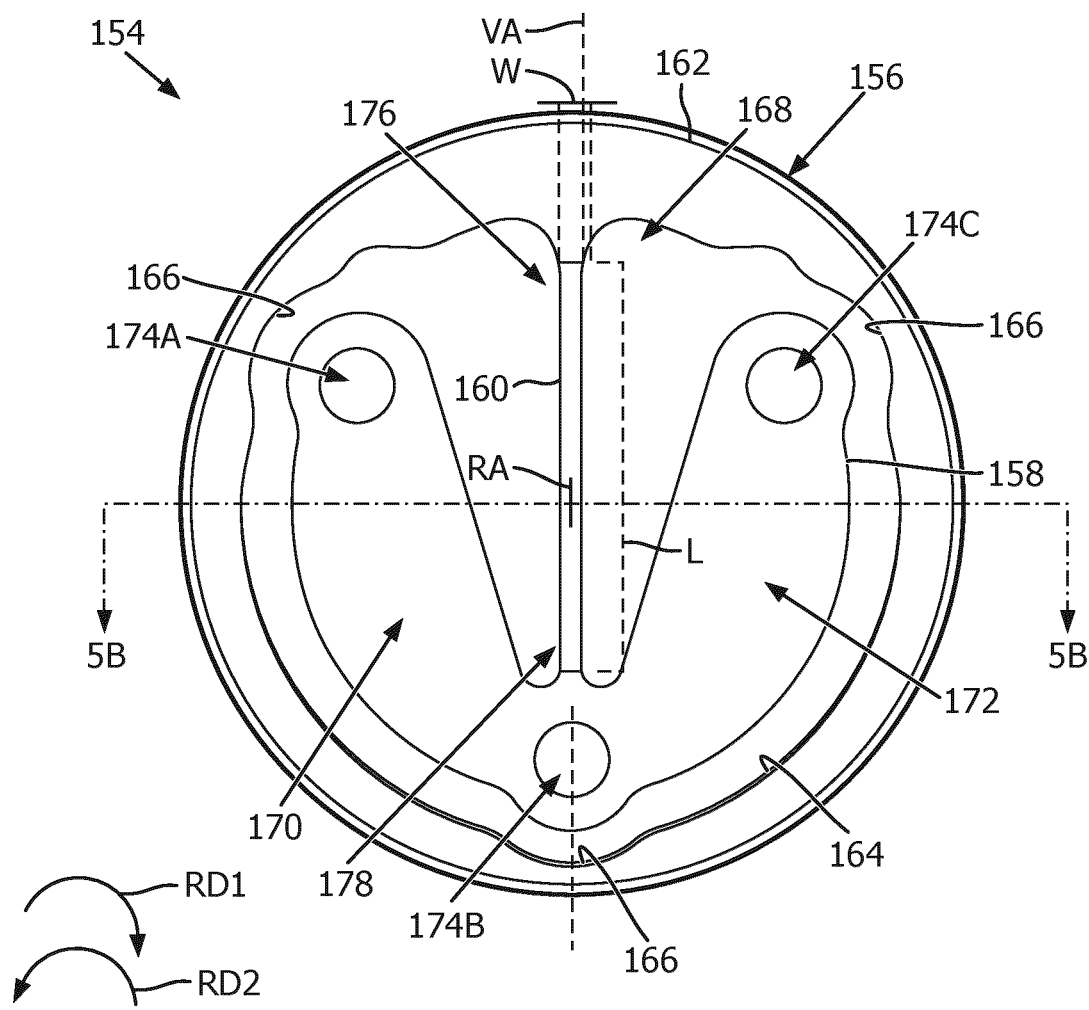
FIG. 5A is a side elevational view of a flexible spring according to the present disclosure.

FIG. 5A is a side elevational view of a flexible spring 154 according to the present disclosure. Although the following description refers to flexible spring 154, it should be appreciated that the following description also applies equally to each flexible spring of first plurality of flexible springs 118A-118C and each flexible spring of second plurality of flexible springs 132A-132C.

Flexible spring 154 includes grounded section 156, rotational member 158, and compliant member 160. In one example, grounded section 156 is an annular ring having an outer surface 162 arranged about the outside of the annular ring, and an inner surface 164 arranged about the inside of the annular ring. It should be appreciated that although illustrated and described as an annular ring, grounded section 156 can take other shapes, e.g., triangular, square, rectangular, octagonal, or any other shape capable of fitting within tube frame 104. Additionally, inner surface 164 of grounded section 156 further includes at least one indentation, e.g., indentation 166 and at least one projection, e.g., projection 168. Indentations 166 are arranged on the continual surface of inner surface 164 and are arranged to allow for rotation of the first and second body portions of rotational member 158 as discussed below. Furthermore, projection 168 is arranged to elevate compliant member 160 away from the inner surface 162 and create a more robust connection between compliant member 160 and grounded section 156. In one example, grounded section 156 is an annular ring and outer surface 162 is an outer circumferential surface and inner surface 162 is an inner circumferential surface.

Rotational member 158 includes first body portion 170 and second body portion 172. First body portion 170 and second body portion are substantially symmetrical about a vertical axis VA aligned with rotational axis RA and through outer surface 162 and inner surface 164, i.e., vertical axis VA splits grounded section 156 into two equal parts centered at the rotational axis RA. Rotational member 158 is arranged to rotate within grounded section 156 about rotational axis RA in first rotational direction RD1 and second rotational direction RD2. Furthermore, rotational member 158 includes a plurality of apertures 174A-174C which are arranged to engage with the first plurality of stack fasteners 122 (shown in FIG. 4) or the second plurality of stack fasteners 136 (shown in FIG. 4). In one example three apertures 174A-174C are provided, one aperture of plurality of apertures 174, e.g., 174A is provided on first body portion 170, one aperture, e.g., 174C is provided on second body portion 172, and a third aperture is provided between the first two apertures, e.g., aperture 174B is provided on rotational member 158 positioned about the vertical axis VA. It should be appreciated that, this configuration of apertures are positioned equidistant from each other as well as equidistant from rotational axis RA. This allows for rotation of rotational member about rotational axis RA while ensuring each stack fastener of the first plurality of stack fasteners 122 or each stack fastener of the second plurality of stack fasteners 136 remain equidistant from rotational axis RA during rotation, stabilizing the rotation of the entire first mass or second mass, respectively. It should be appreciated that more or fewer apertures can be used in any configuration that keeps the rotation of rotational member 158 rotationally centered about rotational axis RA.

As discussed above, flexible spring 154 further includes compliant member 160. Complaint member 160 is a substantially longitudinal member positioned substantially along vertical axis VA and has at least a length L, a width W, and a thickness TH (shown in FIG. 5B). Compliant member 160 further includes a first end 176 fixedly secured to inner surface 164 of grounded section 156, and a second end 178 fixedly secured to rotational member 158. It should be appreciated that first end 176 can be fixedly secured to indentation 166 or projection 168 as discussed above. The length L is determined by the distance between the inner surface 164 and the portion of rotational member 158 that is positioned in line with vertical axis VA. The width W and thickness TH contribute to the rotational stiffness, i.e., first stiffness 180 (not shown) that flexible spring 154 provides to the first or second rotating mass.

Figure 5B:
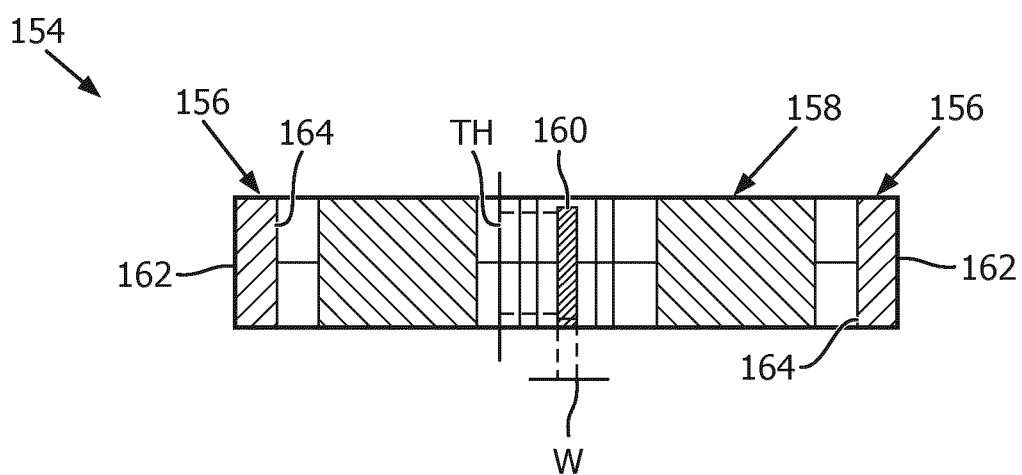
FIG. 5B is a cross-sectional view of the flexible spring taken generally along line 5B-5B in FIG. 5A.

Thickness TH depends on many factors, e.g., method of manufacturing, packaging constraints, and required stiffness. First stiffness 180 (not shown) can be calculated using the equations for determining the area moment of inertia for the bending of a rectangular beam. As can be seen from the equation below, thickness TH of compliant section 160 has a relatively small effect on first stiffness 180 (not shown) compared to width W. It should be appreciated that length L, thickness TH, and width W can be varied to fit the required stiffness for each application of flexible spring 154. In one example, first stiffness 180 (not shown) will be optimized for a power tooth brush which may have a desired frequency range of, e.g., 200-300 Hz, more specifically 260 Hz. FIG. 5B is a cross-sectional view of the flexible spring 154 taken generally along line 5B-5B in FIG. 5A.

$$\text{First Stiffness } 180 = \frac{TH \times W^3}{12}$$

FIGS. 6A-6C illustrate perspective views of flexible spring 154 according to the present disclosure. As described above, flexible spring 154 can be manufactured in various ways. For example, FIG. 6A illustrates a 3D printed resin flexible spring 154. The 3D printed resin flexible spring has a wider overall thickness than other versions of the flexible spring. Additionally, the 3D printed resin flexible spring does not include indentations 166 or projections 168 on inner surface 164. Additionally, as illustrated in FIG. 6A, compliant member 160 of flexible spring 154 can further include a longitudinal recess, i.e., recess R between first end 176 and second end 178 to prevent wear on neighboring flexible springs when positioned in a stack as described herein.

FIG. 6B illustrates an injection-molded resin flexible spring 154. The injection-molded resin flexible spring has more detail than the 3D printed resin flexible spring illustrated in FIG. 6A and includes at least one indentation 166 and at least one projection 168. FIG. 6C illustrates a stamped-steel flexible spring 154. The stamped-steel flexible spring has a heightened level of detail, similar to the injection-molded resin flexible spring illustrated in FIG. 6B and includes at least one indentation 166 and at least one projection 168. The stamped-steel flexible spring has less overall thickness than both the 3D printed resin flexible spring illustrated in FIG. 6A and the injection-molded flexible spring illustrated in FIG. 6B. Additionally, as illustrated in FIG. 6B, compliant member 160 of flexible spring 154 can further include a longitudinal recess, i.e., recess R between first end 176 and second end 178 to prevent wear on neighboring flexible springs when positioned in a stack as described herein.

As illustrated in FIGS. 6A and 6C, various structures can be provided on outer surface 162 of grounded section 156. For example, FIG. 6A illustrates that flexible spring 154 can further include a plurality of alignment apertures 182 arranged about outer surface 162. Additionally, as illustrated in FIG. 6C, flexible spring 154 can further include a plurality of alignment tabs arranged about outer surface 162. Plurality of alignment apertures 182 can be arranged to secure, via a corresponding set of fasteners (not shown) to tube frame 104 to rotationally ground or rotationally secure each flexible spring 154. Similarly, plurality of alignment tabs 184 can be arranged to seat within a plurality of corresponding recesses in tube frame 104, where the length, width, and height of each of the plurality of alignment tabs 184 is substantially similar to the length, width and depth of each of the plurality of corresponding recessing tube frame 104, such that each flexible spring 154 is rotationally grounded or secured within tube frame 104. It should also be appreciated that, in the absence of either of these example structures, each flexible spring 154 can be rotationally fixed and/or secured and/or grounded to tube frame 104 via other methods, e.g., welding, or via any known adhesive.

Figure 7:
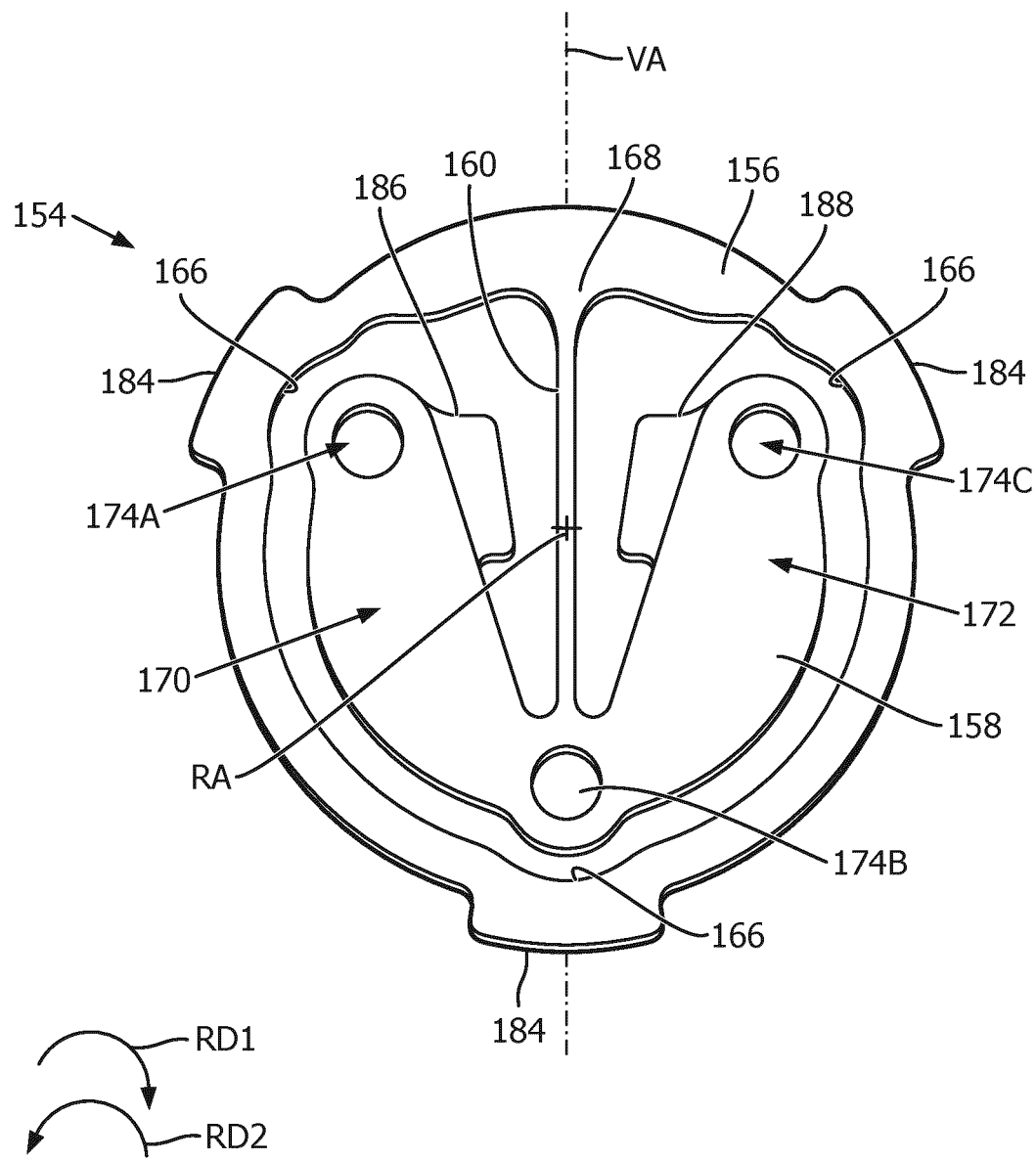
FIG. 7 is a front perspective view of a flexible spring according to the present disclosure.

FIG. 7 is a front perspective view of flexible spring 154 according to the present disclosure. In addition to the variations described above, flexible spring 154 can contain structures arranged to restrict the rotational freedom of rotational member 158 about rotational axis RA in both the first rotational direction RD1 and the second rotational direction RD2. For example, as illustrated in FIG. 7, first body portion 170 can further include first radially inwardly facing tab 186 and second body portion 172 can further include second radially inwardly facing tab 188. Each of these radially inwardly facing tabs project toward compliant member 160 such that, as rotational member 160 rotates in first rotational direction RD1, e.g., clockwise about rotational axis RA, second radially inwardly facing tab 188 contacts compliant member 160 and prevents further rotational movement about rotational axis RA in first rotational direction RD1. Similarly, as rotational member 160 rotates in second rotational direction RD2, e.g., counter-clockwise about rotational axis RA, first radially inwardly facing tab 186 contacts compliant member 160 and prevents further rotational movement about rotational axis RA in second rotational direction RD2. It should be appreciated that any other structure sufficient to prevent rotation freedom of rotational member 158 about rotational axis RA can be utilized and the size of such a structure can be chosen such that the larger the structure or tab the less rotational freedom rotational member 158 has and vice versa.

Figure 8A:
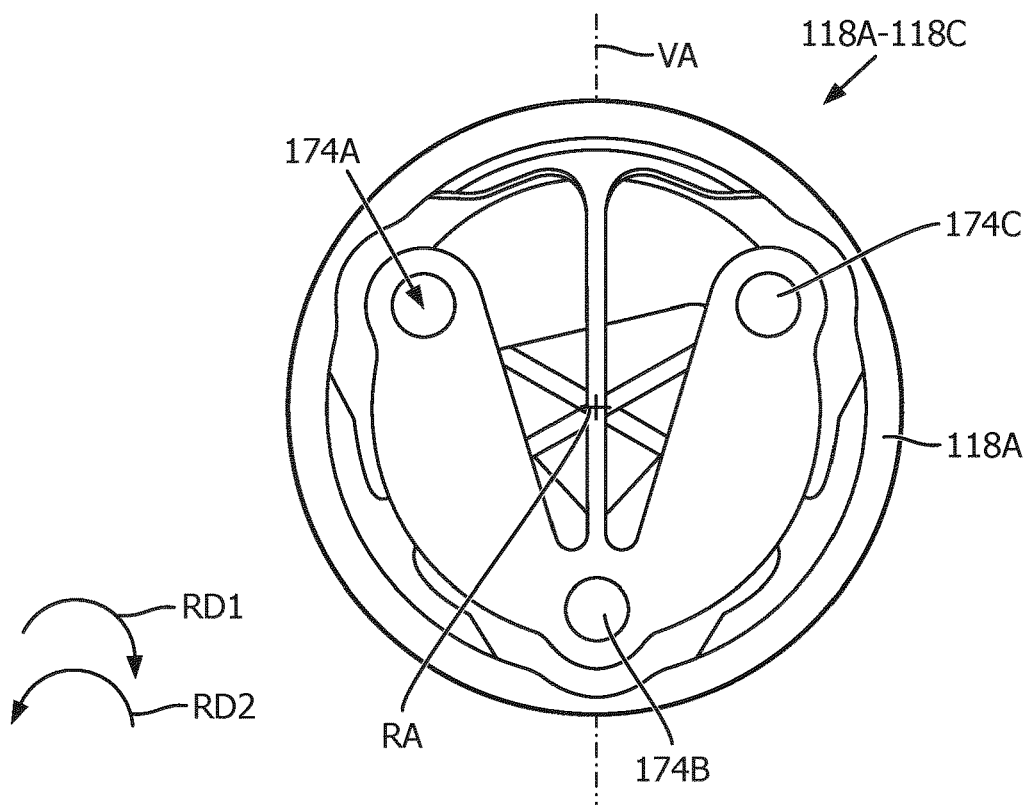
FIG. 8A is a front view a plurality of flexible springs according to the present disclosure.
Figure 8B:
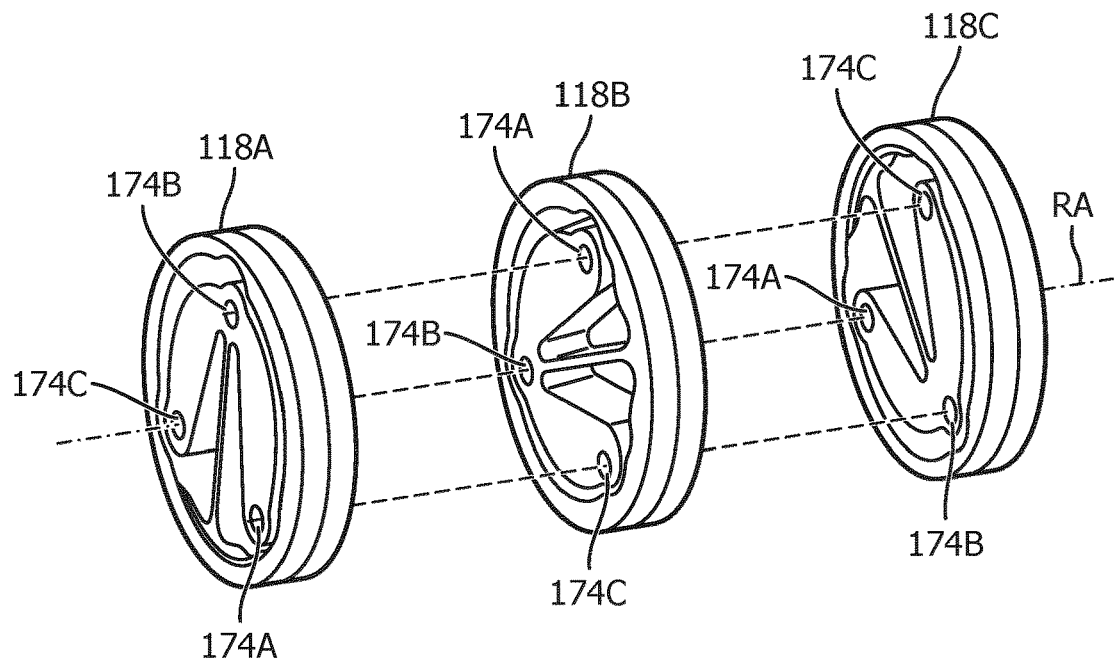
FIG. 8B is an exploded side perspective view of a plurality of flexible springs according to the present disclosure.

FIG. 8A is a front view a first plurality of flexible springs 118A-118C taking the form of a stack of flexible springs. As discussed above, each flexible spring 118A-118C includes each of the components described above with respect to flexible spring 154. FIG. 8B is an exploded side perspective view of the first plurality of flexible springs 118A-118C according to the present disclosure. As illustrated in FIGS. 8A and 8B, in operation, each flexible spring 118A-118C are rotationally offset 120 degrees from each other about the rotational axis RA such that each aperture of the plurality of apertures 174A-174C for a given flexible spring aligns with another aperture of plurality of apertures 174A-174C of another flexible spring. For example, as shown in FIG. 8B, flexible spring 118A includes apertures 174A-174C. Flexible spring 118B may be rotationally offset from flexible spring 118A 120 degrees, such that aperture 174A of flexible spring 118A aligns with aperture 174C of flexible spring 118B. Additionally, flexible spring 118C is also offset 120 degrees from flexible spring 118B, such that aperture 174A of flexible spring 118A aligns with aperture 174C of flexible spring 118B and aperture 174B of flexible spring 118C. Offsetting each flexible spring 118-118C provides a rotationally homogeneous stiffness to the rotation of the first mass FM (shown in FIGS. 10B-11E) about rotational axis RA while maintaining a rotational of the first mass FM (shown in FIGS. 10B-11E) precisely centered about rotational axis RA.

Figure 9A:
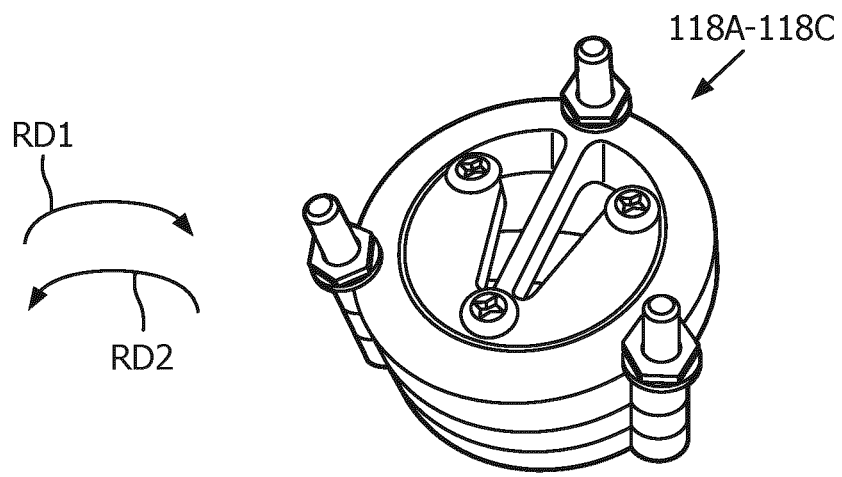
FIG. 9A is a perspective view of a plurality of flexible springs according to the present disclosure.
Figure 9B:
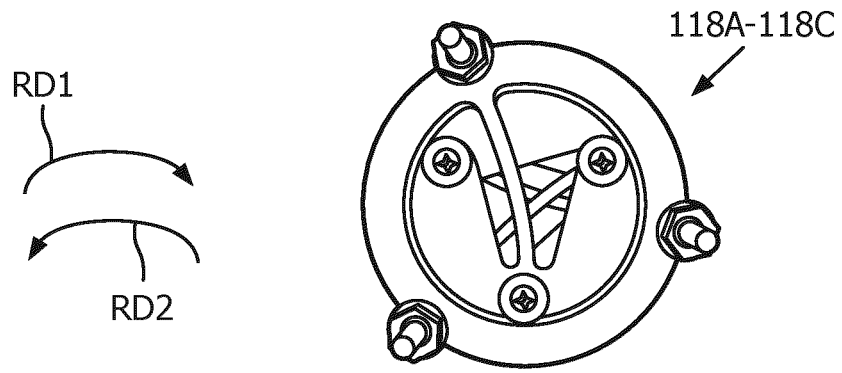
FIG. 9B is a front view of a plurality of flexible springs according to the present disclosure.
Figure 9C:
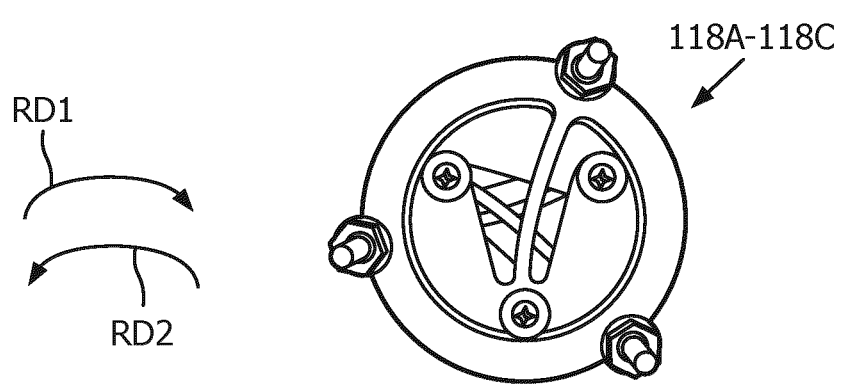
FIG. 9C is a front view of a plurality of flexible springs according to the present disclosure.

FIG. 9A is a perspective view of first plurality of flexible springs 118A-118C according to the present disclosure in a neutral position, i.e., not experiencing a rotational torque. FIG. 9B is a front view of first plurality of flexible springs 118A-118C experiencing a rotational torque in first rotational direction RD1. Conversely, FIG. 9C is a front view of first plurality of flexible springs 118A-118C experiencing a rotational toque in second rotational direction RD2. As can be seen in FIGS. 9B and 9C, even while experiencing a rotational torque in first rotational direction RD or second rotational direction RD2, the first plurality of stack fasteners 122 remain equidistant from rotational axis RA thus maintaining the centered rotation of the first mass FM (shown in FIGS. 10B-11E) about rotational axis RA.

FIGS. 10A-11E illustrate various alternative modes of operation of personal care appliance 100 illustrated schematically for clarity. It should be appreciated that as discussed below, first mass FM can include all of the features and combinations discussed above with respect to the portion of motor assembly 112 proximate hub side 106, and second mass SM can include all of the features and combinations discussed above with respect to the portion of motor assembly 112 proximate magnet side 108. As discussed below in detail, it should be appreciated that each schematic variation discussed is directed to various methods of grounding and/or securing and/or arranging the components discussed above to control torque transfer from the stator sub-assembly 142 through to output shaft 114 in phase or out of phase configurations. It should also be appreciated that, in the following description, the term "back-stator" refers to a configuration where the stator sub-assembly 142 is arranged proximate magnet side 108 of tube frame 104 and the term "middle-stator" refers to a configuration where stator sub-assembly 142 is arranged between first mass FM and second mass FM.

Figure 10A:
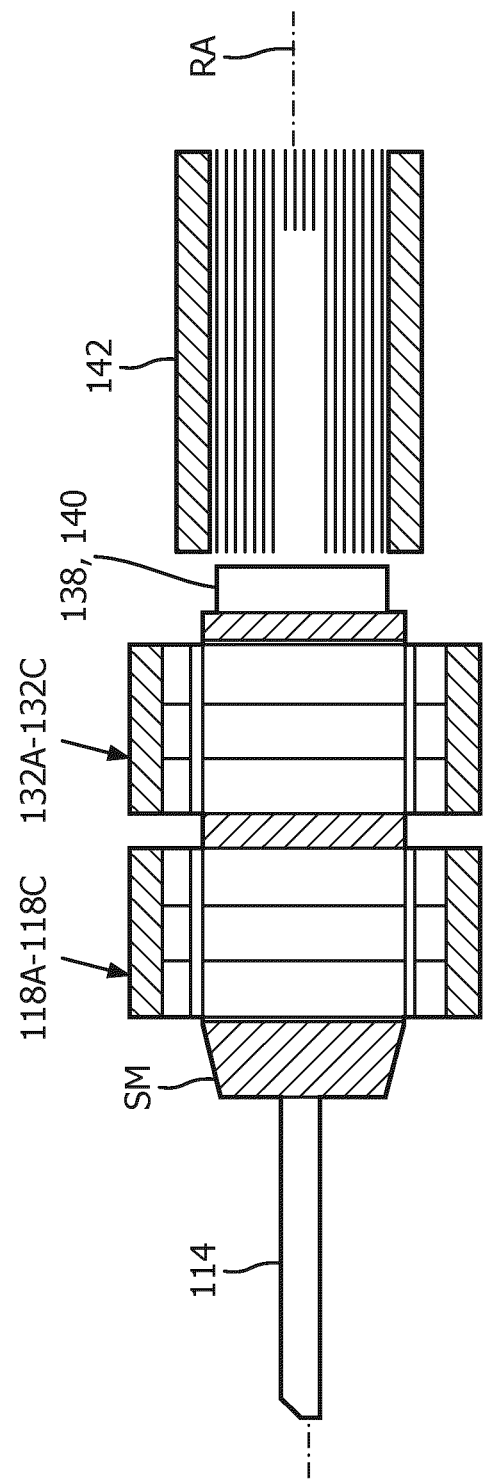
FIG. 10A is a side schematic view of a personal care appliance according to the present disclosure.

FIG. 10A is a side schematic view of a back-stator, direct power configuration of personal care appliance 100. In this configuration, output shaft 114 is connected to second mass SM. Second mass SM is to the inside of first plurality of flexible springs 118A-118C and second plurality of flexible springs 132A-132C. First plurality of flexible springs 118A-118C are rotationally grounded to, e.g., tube frame 104 (not shown) on the outside, i.e., via any of the ways described above to rotationally secure each flexible spring to tube frame 104. Additionally, second mass SM includes magnetic cap 138 and magnet(s) 140 facing stator sub-assembly 142. In this configuration there is only a single phase, i.e., second mass SM rotates as one unit receiving direct power from stator sub-assembly 142.

Figure 10B:
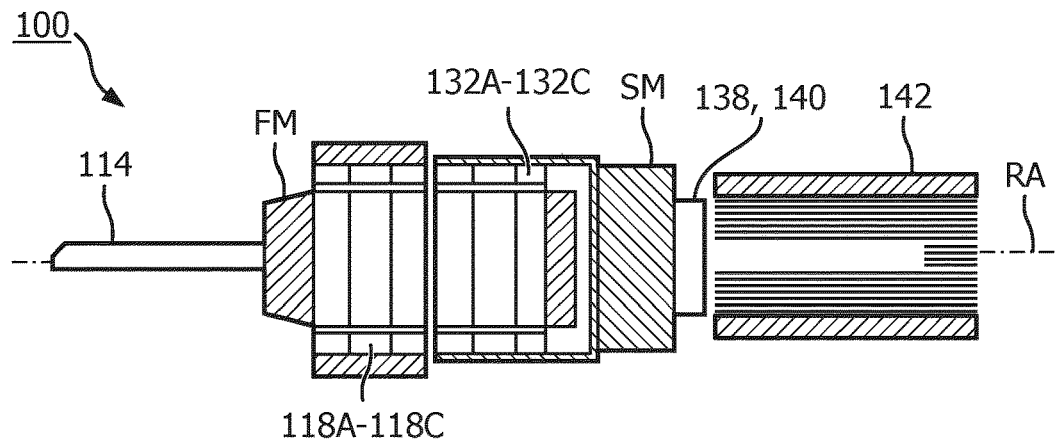
FIG. 10B is a side schematic view of a personal care appliance according to the present disclosure.

FIG. 10B is a side schematic view a back-stator, long-hub configuration of personal care appliance 100. In this configuration, output shaft 114 is connected to first mass FM. First mass FM is rotationally secured to the inside of first plurality of flexible springs 118A-118C and the inside of second plurality of flexible springs 132A-132C. Although first plurality of flexible springs 118A-118C are grounded, second plurality of flexible springs are connected, on the outside, i.e., via their respective outer surfaces 162 to second mass SM. Second mass SM further includes magnetic cap and magnet(s) 140 which accept direct power from stator-sub assembly 142. In this configuration, first mass FM and second mass SM can rotate or oscillate about rotational axis RA out of phase as torque is transfers through first plurality of flexible springs 118A-118C and second plurality of flexible springs 132A-132C. Additionally, although not illustrated, it should be appreciated that a pressure sensor, e.g., a hall-effect sensor can be positioned proximate second mass SM to measure an applied pressure by the user to the brush head of personal care appliance 100 when in use.

Figure 10C:
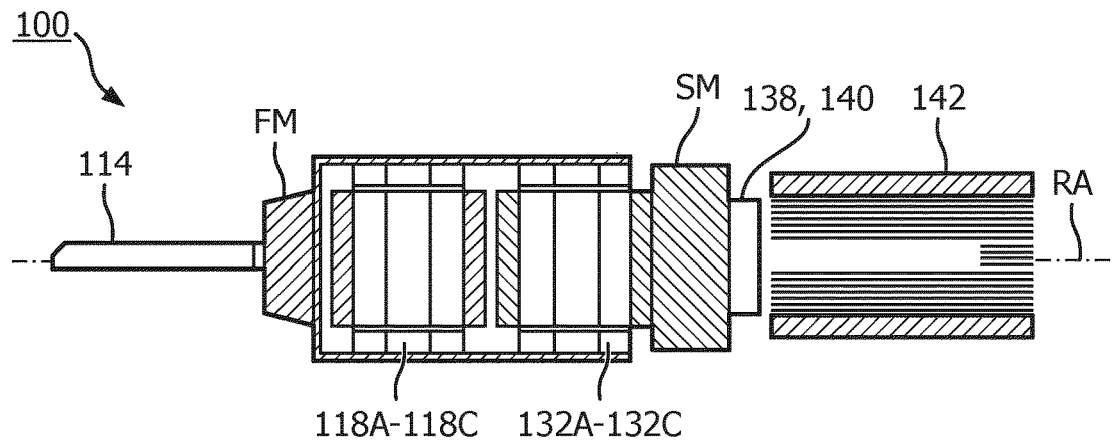
FIG. 10C is a side schematic view of a personal care appliance according to the present disclosure.

FIG. 10C is a side schematic view of a back-stator, exterior rotation configuration a personal care appliance 100. In this configuration, output shaft 114 is secured to first mass FM. First mass is fixedly secured to the outside of first plurality of flexible springs 118A-118C as well as the outside of second plurality of flexible springs 132A-132C. Additionally, the inside of the first plurality of flexible springs 118A-118C are rotationally grounded, while the inside of the second plurality of flexible springs 132A-132C are rotationally secured to second mass SM. Furthermore, second mass SM includes magnetic cap 138 and magnet(s) 140 arranged to engage with the magnetic field produced by stator sub-assembly 142. In this configuration, first mass FM and second mass SM can rotate or oscillate about rotational axis RA out of phase as torque transfers through first plurality of flexible springs 118A-118C and second plurality of flexible springs 132A-132C. Additionally, although not illustrated, it should be appreciated that a pressure sensor, e.g., a hall-effect sensor can be positioned proximate first mass FM to measure an applied pressure by the user to the brush head of personal care appliance 100 when in use.

Figure 10D:
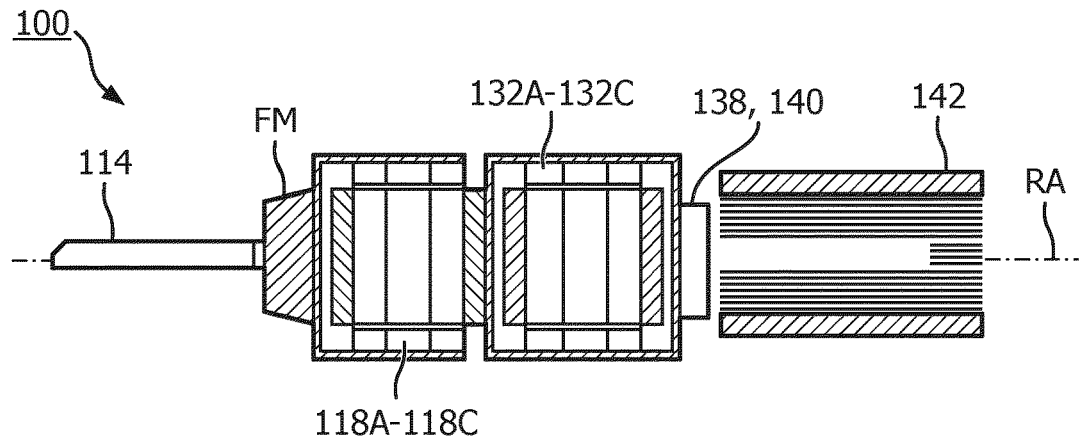
FIG. 10D is a side schematic view of a personal care appliance according to the present disclosure.

FIG. 10D is a side schematic view of a back-stator, middle ground configuration of personal care appliance 100. In this configuration, output shaft 114 is connected to first mass FM. First mass FM is also secured to the outside of first plurality of flexible springs 118-118C. In addition, the inside of first plurality of flexible springs 118A-118C are rotationally secured to second mass SM. Furthermore, second mass SM is secured to the outside of second plurality of flexible springs 132A-132C while the inside of the second plurality of flexible springs 132A-132C is rotationally grounded. Second mass SM includes magnetic cap 138 and magnet(s) 140 arranged to engage with the magnetic field produced by stator sub-assembly 142. In this configuration, first mass FM and second mass SM can rotate or oscillate about rotational axis RA out of phase as torque transfers through first plurality of flexible springs 118A-118C and second plurality of flexible springs 132A-132C. Additionally, although not illustrated, it should be appreciated that a pressure sensor, e.g., a hall-effect sensor can be positioned proximate first mass FM to measure an applied pressure by the user to the brush head of personal care appliance 100 when in use.

Figure 11A:
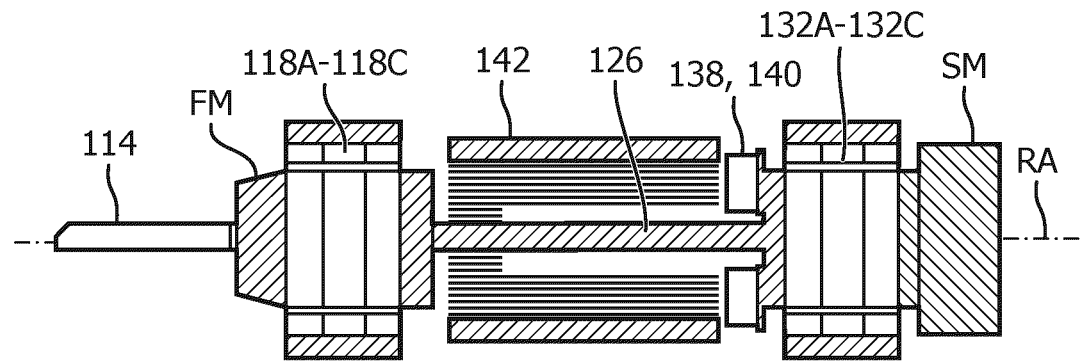
FIG. 11A is a side schematic view of a personal care appliance according to the present disclosure.

FIG. 11A is a side schematic view of middle-stator, torsion bar configuration of personal care appliance 100. In this configuration, output shaft 114 is connected to first mass FM. First mass FM is rotationally connected to the inside of first plurality of flexible springs 118A-118C. Additionally, first mass is fixedly secured to torsion bar 126. Torsion bar 126 is also connected to second mass SM. Second mass SM is rotationally secured to the inside of second plurality of flexible springs 132A-132C and includes magnetic cap 138 and magnet(s) 140 arranged to engage with the magnetic field produced by stator sub-assembly 142. Stator sub-assembly 142 is positioned, around torsion bar 126 and between first mass FM and second mass SM. As illustrated, first plurality of flexible springs 118A-118C, second plurality of flexible springs 132A-132C, and stator sub-assembly 142 are rotationally grounded via their respective outside surfaces. In this configuration, first mass FM and second mass SM can rotate or oscillate about rotational axis RA out of phase as torque transfers through first plurality of flexible springs 118A-118C, second plurality of flexible springs 132A-132C, and torsion bar 126.

Figure 11B:
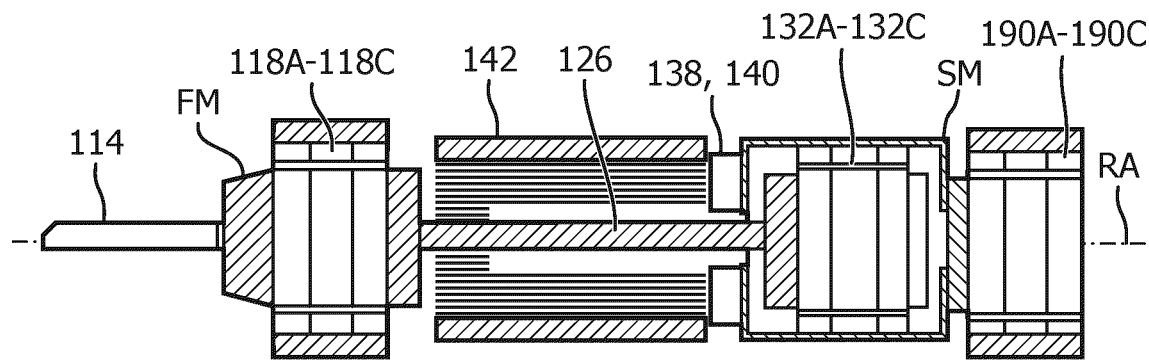
FIG. 11B is a side schematic view of a personal care appliance according to the present disclosure.

FIG. 11B is a side schematic view of a middle stator, rigid torsion bar configuration of personal care appliance 100. In this configuration, output shaft 114 is connected to first mass FM. First mass includes a rigid, i.e., non-rotationally flexible, torsion bar 126. First mass is rotationally secured to the inside of first plurality of flexible springs 118A-118C and the inside of second plurality of flexible springs 132A-132C. The respective outsides of the second plurality of flexible springs 132A-132C are secured to second mass SM. Second mass SM includes magnetic cap 138 and magnet(s) 140 arranged to engage with the magnetic field produced by stator sub-assembly 142 and is rotationally secured to the inside of a third plurality of flexible springs 190A-190C. It should be appreciated that third plurality of flexible springs 190A-190C are substantially similar to the first plurality of flexible springs 118A-118C and second plurality of flexible springs 132A-132C described above. Stator sub-assembly 142 is positioned, around the rigid torsion bar 126. In this configuration the respective outsides of first plurality of flexible springs 118A-118C, the third plurality of flexible springs 190A-190C, and stator sub-assembly 142 are rotationally grounded.

Figure 11C:
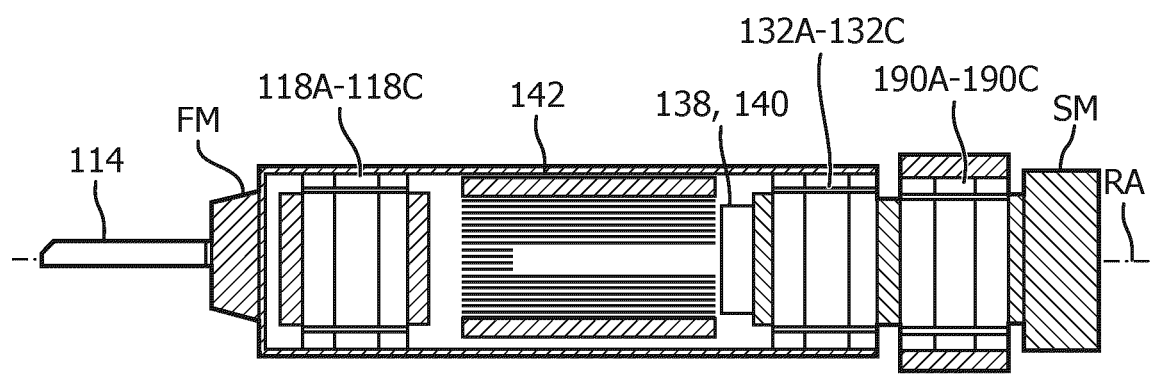
FIG. 11C is a side schematic view of a personal care appliance according to the present disclosure.

FIG. 11C is a side schematic view a middle-stator, extended exterior rotation configuration of personal care appliance 100. In this configuration, output shaft 114 is connected to first mass FM. First mass is connected to the outside of the first plurality of flexible springs 118A-118C and the outside of the second plurality of flexible springs 132A-132C. As first mass FM is secured about the outsides of the respective pluralities of flexible springs, no torsion bar is needed. The inside of the second plurality of flexible springs 132A-132C is rotationally secured to second mass SM. Second mass SM includes magnetic cap 138 and magnet(s) 140 arranged to engage with the magnetic field produced by stator sub-assembly 142. Additionally, second mass SM is rotationally secured to the inside of third plurality of flexible springs 190A-190C. In this configuration the inside of the first plurality of flexible springs and the outside of the third plurality of flexible springs 190A-190C are rotationally grounded.

Figure 11D:
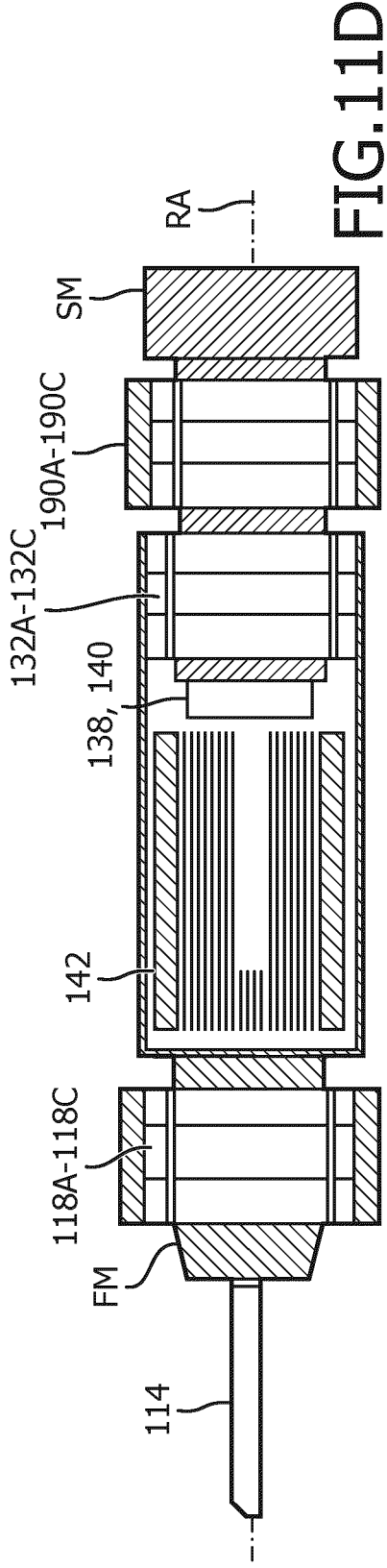
FIG. 11D is a side schematic view of a personal care appliance according to the present disclosure.

FIG. 11D is a side schematic view of a middle-stator, rotating middle section configuration of personal care appliance 100. In this configuration, output shaft 114 is connected to first mass FM. First mass FM is rotationally secured to the inside of first plurality of flexible springs 118A-118C. First mass FM is also connected to the outside of second plurality of flexible springs 132A-132C. The inside of second plurality of flexible springs 132A-132C is rotationally secured to second mass SM. Second mass SM includes magnetic cap 138 and magnet(s) 140 arranged to engage with the magnetic field produced by stator sub-assembly 142. Additionally, second mass SM is rotationally secured to the inside of third plurality of flexible springs 190A-190C. In this configuration the outside of the first plurality of flexible springs and the outside of the third plurality of flexible springs 190A-190C are rotationally grounded.

Figure 11E:
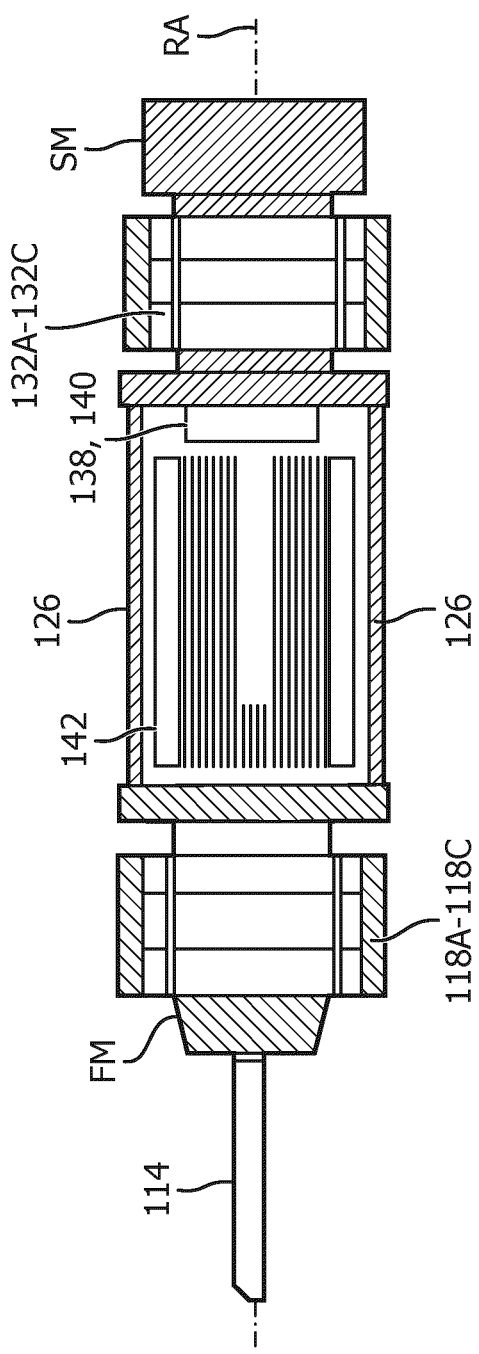
FIG. 11E is a side schematic view of a personal care appliance according to the present disclosure.

FIG. 11E is a side schematic view of a middle-stator, dual torsion bar configuration of personal care appliance 100. In this configuration, output shaft 114 is connected to first mass FM. First mass FM is rotationally secured to the inside of first plurality of flexible springs 118A-118C. First mass FM is connected to second mass Sm via two torsion bars 126. Furthermore, second mass Sm is rotationally secured to the inside of second plurality of flexible springs 132A-132C. Second mass SM includes magnetic cap 138 and magnet(s) 140 arranged to engage with the magnetic field produced by stator sub-assembly 142. In this configuration the outside of the first plurality of flexible springs and the outside of the second plurality of flexible springs 132A-132C are rotationally grounded.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

What is claimed is:

1. A personal care appliance comprising:
   a housing, the housing having a cavity; and
   a motor assembly arranged within the cavity of the housing, the motor assembly comprising:
      a first plurality of flexible springs, each flexible spring of the first plurality of flexible springs comprising:
      a grounded section having an outer surface and an inner surface;
      a rotational member arranged radially within the grounded section, the rotational member arranged to rotate within the grounded section in a first rotational direction about an imaginary rotational axis; and
      a compliant member having a first end and a second end, the first end operatively engaged with the inner surface of the grounded section and the second end operatively engaged with the rotational member;
      wherein the compliant member has a first stiffness such that the compliant member is arranged to resist rotation of the rotational member in at least the first rotational direction.

2. The personal care appliance of claim 1, wherein the housing further comprises an output shaft arranged to rotate about the imaginary rotational axis, and the motor assembly further comprises a second plurality of flexible springs, wherein the first plurality of flexible springs and the second plurality of flexible springs are arranged to only allow the output shaft to rotate in the first rotational direction or a second rotational direction opposite the first rotational direction.

3. The personal care appliance of claim 1, wherein the motor assembly further comprises:
   a first hub arranged within the housing; and
   a stator sub-assembly, the stator sub-assembly comprising:
      a plurality of stator coils arranged to generate a first magnetic field within the housing; and
      at least one magnet operatively engaged with the first hub;
   wherein the magnet, in response to the first magnetic field is arranged to rotate and drive the first hub about the imaginary rotational axis within the housing in at least the first rotational direction.

4. The personal care appliance of claim 1, wherein the housing comprises a tube frame, the tube frame having a hub side and a magnet side, and the motor assembly further comprises:
   a first hub arranged within the housing and proximate the hub side of the tube frame;
   a second hub arranged within the housing and proximate the magnet side of the tube frame; and
   a stator sub-assembly, the stator sub-assembly comprising:

a plurality of stator coils arranged to generate a first magnetic field within the housing; and at least one magnet operatively engaged with the second hub;

wherein the magnet, in response to the first magnetic field is arranged to rotate and drive the first hub or the second hub of the stator sub-assembly about the imaginary rotational axis within the housing in at least the first rotational direction.

5. The personal care assembly of claim 4, wherein the first hub is arranged to rotate out of phase with the second hub about the imaginary rotational axis.

6. The personal care assembly of claim 4, wherein at least one torsion bar is arranged between the first hub and the second hub, wherein the torsion bar is arranged to receive, in response to a rotation of the second hub, a first torque, and transfer the first torque to the first hub, wherein the rotation of the first hub and the rotation of the second hub are out of phase.

7. The personal care assembly flexible spring of claim 1, wherein the rotational member further comprises a first body portion and a second body portion, wherein the first body portion and the second body portion are symmetrical about an imaginary vertical axis substantially parallel with the compliant member.

8. The personal care assembly of claim 7, wherein the first body portion of the rotational member has a first radially inwardly facing tab, and the second body portion of the rotational member has a second radially inwardly facing tab, wherein the first radially inwardly facing tab and the second radially inwardly facing tab are arranged to limit rotation of the rotational member in the first rotational direction and a second rotational direction opposite the first rotational direction.

9. The personal care assembly of claim 1, wherein the rotational member further comprises a plurality of apertures.

10. The personal care assembly of claim 9, wherein the plurality of apertures comprises a first aperture, a second aperture, and a third aperture wherein the first aperture, the second aperture, and the third aperture are rotationally offset 120 degrees from each other about the imaginary rotational axis.

11. The personal care assembly of claim 1, wherein the inner surface comprises a first indentation.

12. The personal care assembly of claim 1, wherein the inner surface comprises a first projection.

13. The personal care assembly of claim 1, wherein the outer surface further comprises a plurality of alignment tabs.

14. The personal care assembly of claim 1, wherein the outer surface further comprises a plurality of alignment apertures.

* * * * *